United States Patent [19]

Mort, Jr. et al.

[11] 3,964,947

[45] June 22, 1976

[54] BOTTOM LABELING METHOD AND APPARATUS

[75] Inventors: Paul R. Mort, Jr.; Robert A. Cleary, both of Yonkers, N.Y.

[73] Assignee: Synchro-Motion Corporation, Yonkers, N.Y.

[22] Filed: June 19, 1975

[21] Appl. No.: 588,148

Related U.S. Application Data

[62] Division of Ser. No. 469,549, May 13, 1974.

[52] U.S. Cl. .................................. 156/64; 156/351; 156/364; 156/378

[51] Int. Cl.² .......................................... B32B 31/00

[58] Field of Search ........... 156/350, 351, 357, 322, 156/378, 64, 364; 198/21, 22 B; 53/53, 54

[56] References Cited

UNITED STATES PATENTS

| | | | |
|---|---|---|---|
| 2,759,283 | 8/1956 | Bowman et al. | 156/542 |
| 3,522,134 | 7/1970 | Von Hofe et al. | 156/357 X |
| 3,783,058 | 1/1974 | Solomon et al. | 156/351 X |

*Primary Examiner*—William A. Powell
*Assistant Examiner*—David A. Simmons
*Attorney, Agent, or Firm*—Roylance, Abrams, Berdo & Kaul

[57] ABSTRACT

A method and apparatus for applying a label to the bottom of a product, the label having a universal product code thereon. The apparatus includes a first labeling assembly, a first scanning assembly, a second labeling assembly, a second scanning assembly and means for feeding a product past these assemblies along a feeding path. The first scanning assembly detects whether or not the first labeling assembly has applied a label to the bottom of the product and if none was applied then activates the second labeling assembly to apply a label and if the second scanning assembly determines that no label has yet been applied to the product, that product is diverted from the feeding path. Additionally, a character recognition assembly is provided to determine if the correct label has been applied to the product and to divert a mislabeled product from the feeding path. The method includes feeding the product past a first labeling station, scanning the product to determine if a label has been applied, feeding the product past a second labeling station, scanning the product a second time and diverting the product from the feeding path if the product has no label applied thereto. Additionally, the method includes the step of detecting whether the correct label has been applied to the bottom of the product to divert a mislabeled product.

2 Claims, 4 Drawing Figures

BOTTOM LABELING METHOD AND APPARATUS

This is a division of application Ser. No. 469,549, filed May 13, 1974.

This invention relates to the labeling of products and more specifically relates to an apparatus and method for bottom labeling a product, the label having a universal product code thereon. As used herein, the term "product" means any item or any container, bottle or box which has a substantially flat bottom.

The use of universal product codes or UPC is recognized as being an efficient means of inventory control since the product codes can be electronically read and the information fed to a data processing system. It is believed that the best way of applying the universal product code to a product is on the bottom of the product, for the code would then not interfere with the name, trademark or advertising material on the exterior of the product. Furthermore, in view of the fact that various containers, including bottles, boxes or cartons, are formed from various types of material, the best way of providing the universal product code is believed to be by application of a pressure-sensitive label to the bottom of the container, the label having the universal product code printed thereon.

Although labeling machines and methods are well known and machines and methods for labeling the bottom of products are also known, these prior art devices fail to assure that a label is applied to each and every product passing through the machine, and sometimes, due to human or mechanical error, a label is placed on the product which has the incorrect information thereon.

Therefore, it is an object of the present invention to provide a bottom labeling method and apparatus which assures that a label is placed on each and every product passing through the machine and, if the label is not applied, then the product is diverted from the feeding path of the apparatus.

Another object of the present invention is to provide a method and apparatus for detecting whether a correct label has been applied to the bottom of the product and to divert that product if it is mislabeled.

The foregoing objects are attained by providing an apparatus which comprises a feeding assembly for conducting a product along a predetermined feeding path, a first labeling assembly for applying a label to the bottom of a product fed past that assembly, a second labeling assembly spaced from the first labeling assembly along the feeding path, a first scanning assembly located between the first and second labeling assemblies for detecting whether a label has been applied to the bottom of the product at the first labeling assembly and for actuating the second labeling assembly if the label has not been applied, a diverting gate spaced from the second labeling assembly for diverting a product from the feeding path and a second scanning assembly for detecting whether a label has been applied to the bottom of the product and for actuating the diverting gate to divert the product if no label has been applied to the bottom thereof.

The method of the present invention generally comprises the steps of feeding a product past a first labeling station which is adapted to apply the label to the bottom of the product, scanning the product to determine if a label has been applied to the bottom thereof at the first labeling station, feeding the product past a second labeling station which is adapted to apply a label to the bottom of the product, applying a label to the bottom of the product at the second labeling station if the scanning determined no label was applied in the first labeling station, scanning the product a second time to determine if a label has been applied to the bottom thereof, and diverting the product from the feeding path of such products if the second scanning step determines that no label has been applied to the bottom of the product.

Other objects, advantages and salient features of the present invention will become apparent from the following detailed description which, taken in conjunction with the annexed drawings, discloses a preferred embodiment of the present invention.

Referring now to the drawings which form a part of this original disclosure:

Figure 2:
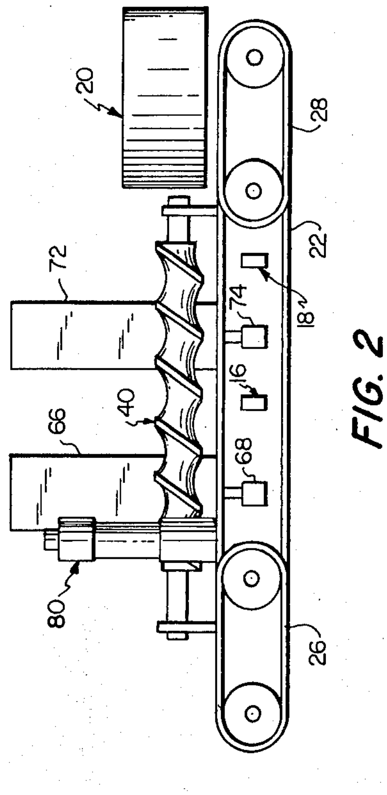
FIG. 2 is a longitudinal sectional view of the device shown in FIG. 1 taken along lines 2—2 in FIG. 1.
Figure 1:
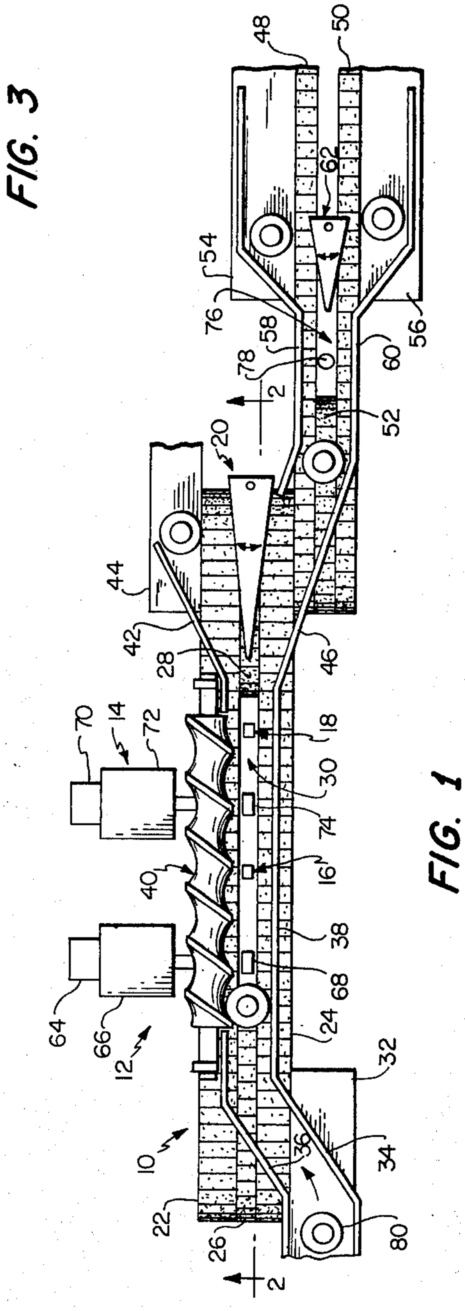
FIG. 1 is a top plan view of an apparatus in accordance with the present invention.

Referring to the drawings in more detail, as shown in FIGS. 1 and 2, the apparatus comprises a feeding assembly 10, a first labeling device 12, a second labeling device 14, a first scanning assembly 16, a second scanning assembly 18, and a first diverting gate 20.

The feeding assembly comprises various endless conveyors, guide supports and an indexing auger. Forming the first part of the feeding assembly is a first endless conveyor 22, a second endless conveyor 24, a third endless conveyor 26 and a fourth endless conveyor 28. The first and second conveyors 22 and 24 are conventionally mounted on rollers such as those shown in FIG. 2, have their top surfaces in the same plane and are parallel and spaced relative to each other. Suitably supported between the ends of the first and second conveyors 22 and 24 is the third conveyor 26 which has a surface in the same plane as the top surfaces of the first and second conveyors and has an end spaced from the end of the fourth conveyor 28 which is located between the other end of the first and second conveyors, the fourth conveyor also having its top surface in the same plane containing the surfaces of the first and second conveyors. A slot 30 is defined by the adjacent sides of the first and second conveyors and the opposing ends of the third and fourth endless conveyors 26 and 28.

These four endless conveyors are all conventionally supported and run by suitable power means at the same speed, the surfaces thereof moving from the left to the right as shown in FIGS. 1 and 2.

As shown in FIG. 1, an infeed conveyor 32 is positioned adjacent one end of the second endless conveyor with parallel guide supports 34 and 36 conventionally mounted above the surface of the infeed and second conveyors for directing products from the infeed conveyor onto the first, second and third endless conveyors.

A guide rail 38 is suitably supported above the second conveyor 24 and is parallel to the longitudinal axis of the elongated slot 30 and extends substantially from one edge of the slot to the other.

Suitably supported for rotation above the first conveyor 22 is an indexing auger 40 which has teeth or ridges spaced a distance from each other so that a product 80 may be suitably received therein on one side and contact the inside of the guide rail 38 at the same time.

Figure 3:
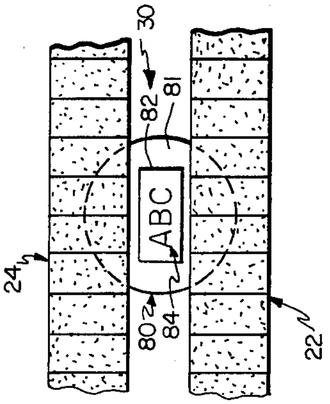
FIG. 3 is a fragmentary bottom view of a product spanning two coneyors and having a universal product coded label thereon.

As shown in FIG. 3, the bottom 81 of the product spans slot 30 and has an edge supported on each of the first and second endless conveyors. Thus, the product is supported so that a midportion of the bottom is exposed to the labeling and scanning assemblies located below the slot. Therefore, as described in more detail hereinafter, a label 82 having a universal product code 84 thereon can be adhered to the bottom of the product and the presence of the label detected, all through the slot 30.

At the right-hand end of the first conveyor 22 shown in FIG. 1 is a support rail 42 which extends from a position in the middle of the first endless conveyor to one edge of a discard conveyor 44 which is mounted parallel and adjacent to the outside edge of the end of the first conveyor.

Similarly, a second support rail 46 is suitably supported above the second conveyor and is preferably in contact with the end of the guide rail 38, the support rail 46 extending outwardly over a series of parallel fifth, sixth and seventh endless conveyors designated 48, 50 and 52.

Adjacent the fifth conveyor 48 is a second discard conveyor 54 and adjacent the sixth conveyor 50 is an outfeed conveyor 56. Suitable guides 58 and 60 are positioned above these conveyors.

Pivotally mounted at the end of the first and second conveyors is the first diverting gate 20 which is conventionally powered and is actuated to pivot around a vertical axis so as to alternately divert a product to either the discard conveyor 44 or th fifth, sixth and seventh conveyors.

Similarly, a second diverting gate 62 is pivotally mounted between the fifth and sixth conveyors so as to divert a product either to the discard conveyor 54 or the outfeed conveyor 56.

The first and second labeling devices 14 and 16 can be similar to those disclosed in U.S. Pat. No. 3,093,528 which issued on June 11, 1963 to Robert L. Reich. As disclosed therein, the label applying machine applies the labels by means of a blast of high pressure air which is directed against a pressure-sensitive label, thereby the label is driven against an article, in this case the bottom of the product, with sufficient force to adhere the pressure-sensitive surface thereto. Is is contemplated that the universal product code 84 will be printed on the surface of the label 82 which is exposed and is opposite to the pressure-sensitive surface. As an alternative, the labeling devices can be similar to the labeling heads disclosed in our U.S. Pat. No. 3,682,743 which issued on Aug. 8, 1972.

As shown in FIG. 1, the first labeling device 12 has a label reel 64, a main body 66 and a labeling head 68 connected to the device body and located directly below the slot 30 adjacent one edge of the third conveyor 26. In a similar fashion, the second labeling device 14 has a label reel 70, a main body 72 and a labeling head 74 connected to the body and positioned directly below the slot 30 at a position spaced from the first labeling head 68.

On activation, each of these labeling heads will adhesively apply a label 82 to the bottom 81 of a product 80 with the universal product code 84 being exposed on the exterior surface of the label as shown in FIG. 3.

Each of the scanning assemblies 16 and 18 are suitably mounted directly below the slot 30 with the first scaning assembly 16 being located between the labeling heads 68 and 74 and the second scanning assembly 18 being located between the second labeling 74 and the front of the diverting gate 20.

Figure 4:
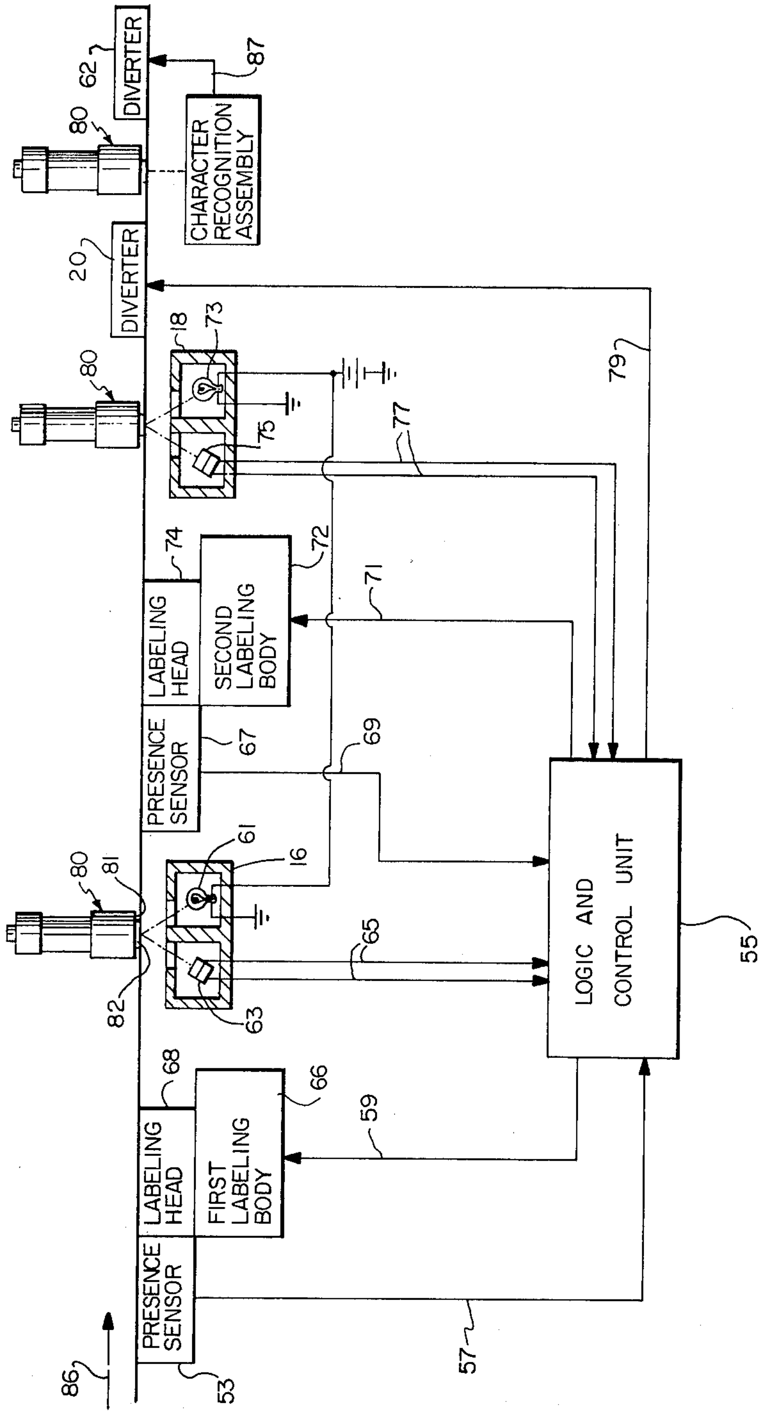
FIG. 4 is a schematic diagram of the various assemblies forming part of the present invention and the interrelationship therebetween.

As shown in FIG. 4, the presence of a product 80 in the proper position to receive a label from the labeling body 66 is determined by a presence sensor 53. A signal from the sensor is supplied to a logic and control unit 55 on a conductor 57. The control unit provides an activating signal to the labeling body 66 on conductor 59 to activate labeling head 68 which then goes through the motion of applying a label to the product bottom through slot 30. The product then moves along the feeding path 86 to scanning assembly 16 which includes a light source 61 and a photocell 63. The source and cell are selected and pointed through slot 30 toward a location of the product so that the existence of a label will produce a signal on conductors 65, indicating to the logic and control unit that a label has been properly applied. The absence of a label produces a different signal, this being an on and off signal of a binary nature.

The product then continues to move until it arrives in the vicinity of the second labeling body 72 which is provided with a second presence sensor 67. The existence of the product provides a signal on conductor 69 to the control unit which, in the absence of a "proper label" signal on conductors 65, provides a label machine activating signal on conductor 71 to energize labeling body 72, causing head 74 to attempt placing a label on the container again. The product then continues along the feeding path to the second scanning assembly 18 which also includes a light source 73 and a photocell 75. Scanning assembly 18 produces a signal on conductors 77 which causes control unit 55 to recognize the presence of a product and either the presence or absence of a label. If the label is not present, control unit 55 produces an electrical signal on conductor 79 which energizes diverter 20 and causes the product to be diverted away from the feeding path of labeled products.

As seen in FIG. 1, mounted in the second slot 76 defined by adjacent edges of the fifth and sixth conveyors 48 and 50 and the end of the seventh conveyor 54 is a character recognition assembly 78 which is capable of reading the label applied to the product and determining whether the correct label, i.e., a label having the appropriate product code, has been applied to the product bottom. The diverting gate 62 is responsive to a signal emanating from the character recognition assembly 78 along conductor 87 and will divert to the discard conveyor 54 any products which are mislabeled and are fed past the assembly.

Any suitable character recognition assembly may be utilized, such as that disclosed in the McGraw-Hill Encyclopedia of Science and Technology, Volume 3, pages 11-14 (1971 edition).

In operation, the infeed conveyor 32 is operated so a product 80 is delivered via the guide supports 34 and 36 onto the first, second and third endless conveyors with its bottom supported thereon. With these conveyors actuated, the product 80 is moved towards, and is engaged by, the rotating indexing auger 40 on one side and the guide rail 38 on the other side.

As the product is moved by these conveyors and the auger, the bottom of the product which is supported by conveyors 22 and 24 and spans slot 30 passes over the labeling head 68 associated with the first labeling device where a label is to be applied to the bottom thereof. The product then proceeds along the feeding assembly and passes over the first scanning assembly 16 which detects whether or not a label has been applied at the first labeling device. If the label has in fact been applied, then the second labeling device is not activated and the product continues along the feeding path over the second scanning assembly; however, if the first scanning assembly determines that a label was not applied at the first labeling device, then the second labeling device is activated and applies a label to the bottom of the product.

The product then passes over the second scanning assembly and, responsive to that scanning, is diverted to the discard conveyor 44 if no label has yet been applied and is diverted to the series of the fifth, sixth and seventh conveyors if the label has been applied.

Guided by the support rail 46 and guides 58 and 60, the product 80 then moves along the fifth, sixth and seventh endless conveyors with the bottom of the product spanning the second slot 76 where the character recognition assembly 78 determines whether the correct label has been applied to the labeled product.

If the correct label has been applied, then the second diverting gate is activated to divert the product to the outfeed conveyor 56; however, if an incorrect label has been applied, then the second diverting gate diverts the product to the second discard conveyor 54.

Although reference has been made to discard conveyors 44 and 54, it is contemplated that rather than these being conveyors, a receptacle or chute can be used to receive the diverted products. Additionally, it is contemplated that a system for returning the nonlabeled product to the infeed conveyor 32 can be used.

Thus, in the manner described above, a product which is successfully labeled with a correct label follows a feeding path 86 which consists of traveling along the infeed conveyor 32, being diverted by the guide supports 34 and 36 onto the first, second and third conveyors, being moved over the slot 30 by the movement of those conveyors and the rotating indexing auger, then being diverted by the first diverting gate 20 through the guides 58 and 60 and along the fifth, sixth and seventh conveyors over the character recognition assembly and finally diverted by the second diverting gate 62 onto the outfeed conveyor 56.

Additionally, the utilization of the second diverting gate 62 can be eliminated by positioning the character recognition assembly 78 adjacent the second scanning assembly 18 between that assembly and the first diverting gate 20 directly below slot 30. In this arrangement after the second scanning is performed the character recognition assembly scans the bottom of the product 80 and, being connected to the first diverting gate 20, activates this gate to divert a product having an incorrect label on the bottom thereof.

While one advantageous embodiment has been chosen to illustrate the invention, it will be understood by those skilled in the art that various changes and modifications can be made therein without departing from the scope of the invention as defined in the appended claims.

What is claimed is:

1. A method of bottom labeling a product comprising the steps of:

feeding a product past a first labeling station which is adapted to apply a label to the bottom of the product;

scanning the product to determine if a label has been applied to the bottom at the first labeling station;

feeding the product past a second labeling station which is adapted to apply a label to the bottom of the product;

applying a label to the product bottom at the second labeling station if the scanning determined no label was applied in the first labeling station;

scanning the product a second time to determine if a label has been applied to the bottom thereof; and diverting the product from the feeding path of such product if the second scanning step determines that no label has been applied to the bottom of the product.

2. A method according to claim 1 and further including the steps of:

detecting whether the correct label has been applied to the bottom of the product; and diverting the product from the feeding path of such products if the detecting step determines that an incorrect label has been applied to the bottom of the product.

* * * * *